United States Patent
Khan et al.

(10) Patent No.: US 8,365,274 B2
(45) Date of Patent: Jan. 29, 2013

(54) METHOD FOR CREATING MULTIPLE VIRTUALIZED OPERATING SYSTEM ENVIRONMENTS

(75) Inventors: Ismail Shamirulla Khan, Bangalore (IN); Manish Kulshreshtha, Chennai (IN); Janice Margaret O'Brien, Round Rock, TX (US); Dilip Kumar Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 12/208,619

(22) Filed: Sep. 11, 2008

(65) Prior Publication Data

US 2010/0064364 A1    Mar. 11, 2010

(51) Int. Cl.
    *G06F 21/00* (2006.01)
(52) U.S. Cl. ............... 726/16; 713/189; 718/1
(58) Field of Classification Search ........... 726/16; 713/189; 718/1
    See application file for complete search history.

(56) References Cited

U.S. PATENT DOCUMENTS

| | | | |
|---|---|---|---|
| 7,526,774 B1 * | 4/2009 | Beck et al. .................. 719/320 |
| 2003/0072031 A1 * | 4/2003 | Kuwata et al. ............... 358/1.15 |
| 2005/0091286 A1 * | 4/2005 | Fineberg et al. ............. 707/200 |
| 2006/0236127 A1 | 10/2006 | Kurien et al. |
| 2007/0130119 A1 * | 6/2007 | Phillips ............................ 707/3 |
| 2008/0066143 A1 | 3/2008 | Charles Tai et al. |
| 2008/0077993 A1 | 3/2008 | Zimmer et al. |
| 2008/0126579 A1 | 5/2008 | Corneli et al. |
| 2009/0037718 A1 * | 2/2009 | Ganesh et al. .................... 713/2 |
| 2009/0063691 A1 * | 3/2009 | Kalofonos et al. ............ 709/229 |
| 2009/0100423 A1 * | 4/2009 | Doyle et al. ..................... 718/1 |
| 2009/0249051 A1 * | 10/2009 | TeNgaio et al. ................. 713/1 |
| 2009/0325562 A1 * | 12/2009 | Hough et al. ................ 455/418 |

OTHER PUBLICATIONS

Blanchard, Bruno et al., "Introduction to Workload Partition Management in IBM AIX Version 6.1" Nov. 2007, 298 pages.*
Alford, Jack "AIX 6.1 Workload Partitions," Nov. 20, 2007, pp. 1-9 <http://www.ibm.com/developerworks/aix/library/au-workload/>.*

* cited by examiner

*Primary Examiner* — Michael Pyzocha
(74) *Attorney, Agent, or Firm* — Yee & Associates, P.C.; David A. Mims, Jr.

(57) ABSTRACT

A method of processing multiple workload using virtualized operating system environments. The creation of a new user in a global operating system may automatically cause the creation of a working partition (WPAR) instance. The user will be associated with the WPAR instance and a virtualized operating system environment will be created from the global operating system within the WPAR instance. Within the WPAR instance, the user may be assigned a root identification which enables the user to have root access privileges to perform operations or processes that may only be performed by a root user. The removal of a user from the system also results in the deletion of the associated WPAR.

15 Claims, 5 Drawing Sheets

METHOD FOR CREATING MULTIPLE VIRTUALIZED OPERATING SYSTEM ENVIRONMENTS

BACKGROUND

1. Field of the Invention

The present disclosure is directed to managing multiple work loads on a system. Specifically, the method is directed to creating virtualized operating systems within work load partitions (WPARs).

2. Description of the Related Art

In operating systems having a workload partition (WPAR) capability, a newly created user in a WPAR may have restricted operating privileges. As a result, a user may need to operate within a global operating system which will provide unrestricted access and unlimited privileges to the user. Within the global operating system, a user may run applications that have restricted permissions. However, initiating multiple processes from multiple users that have unrestricted access may result in a corruption of the global operating system. Additionally, allowing multiple users to have access and share the resources of the global operating system resources may compromise the security of the system.

BRIEF SUMMARY

This disclosure describes the automatic creation of a virtualized operating system for a user within a work load partition (WPAR) that enables the efficient management of multiple work loads.

According to one disclosed class of innovative embodiments, there is disclosed a computer implemented method for processing multiple workloads. The method comprises creating a new user within a global operating system. The creation of the new user results in the automatic generation of a workload partition (WPAR) instance that becomes associated with the new user. Hardware resources from the global operating system may be allocated to the WPAR instance. The new user authenticates as a root user in the WPAR instance and all processes launched by the root user within the WPAR instance are isolated from the global operating system and any other WPAR instances.

According to another disclosed class of innovative embodiments, there is disclosed a system for processing multiple workloads. The system comprises a global operating system and a workload partition instance in the global operating system. The workload partition comprises a virtualized operating system instance allocated from the global operating system.

According to another disclosed class of innovative embodiments, there is disclosed a computer program product comprising a computer recordable medium tangibly embodying instructions which when executed by a processor perform actions comprising: creating a new user within a global operating system, automatically generating a workload partition (WPAR) instance associated with the new user, allocating hardware resources from the global operating system to the WPAR instance, authenticating the new user as a root user in the WPAR instance, and isolating all processes launched by the root user within the WPAR instance.

The embodiments of the disclosure provide an advantage of enhancing security in a global operating system environment. Since the applications executed by normal users are isolated within their WPAR, the global operating system remains free from corruption.

The embodiments of this disclosure also provide an advantage of allowing a normal user to operate as a root user and have unrestricted privileges and permissions to perform operations or processes within the WPAR corresponding to the user.

The embodiments of this disclosure also simplify the allocation of resources of the global operating system to each WPAR. The global operating system may provide a WPAR with hardware resources for the user. After the user is removed, the WPAR and its associated resources are returned to the system.

BRIEF DESCRIPTION OF THE SEVERAL VIEWS OF THE DRAWINGS

For a more complete understanding of the present disclosure and the advantages thereof, reference is now made to the following brief description, taken in connection with the accompanying drawings and detailed description, wherein similar or identical reference numerals represent similar or identical parts.

DETAILED DESCRIPTION

The present disclosure is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the computer program product embodied in any tangible medium of expression having computer usable program code embodied in the medium.

In embodiments of this disclosure, the creation of a user within a global operating system automatically generates a work load partition (WPAR). The generation of the WPAR enables the existence of a virtualized operating system environment in which a user may perform various operation and process. Within the virtualized operating system environment of its WPAR, a user may have root, or unrestricted, privileges to perform operations or execute applications. The global operating system may even create several users with corresponding WPARs and each of the users and WPARs may function independently of each other and the global operating system. The global operating system may also allocate resources to each respective WPAR to enable the independent operation of the WPAR. After a user has completed operations within its respective WPAR, the user may be deleted from the WPAR. The deletion of the user may automatically remove the WPAR instance associated with the deleted user.

Figure 1:
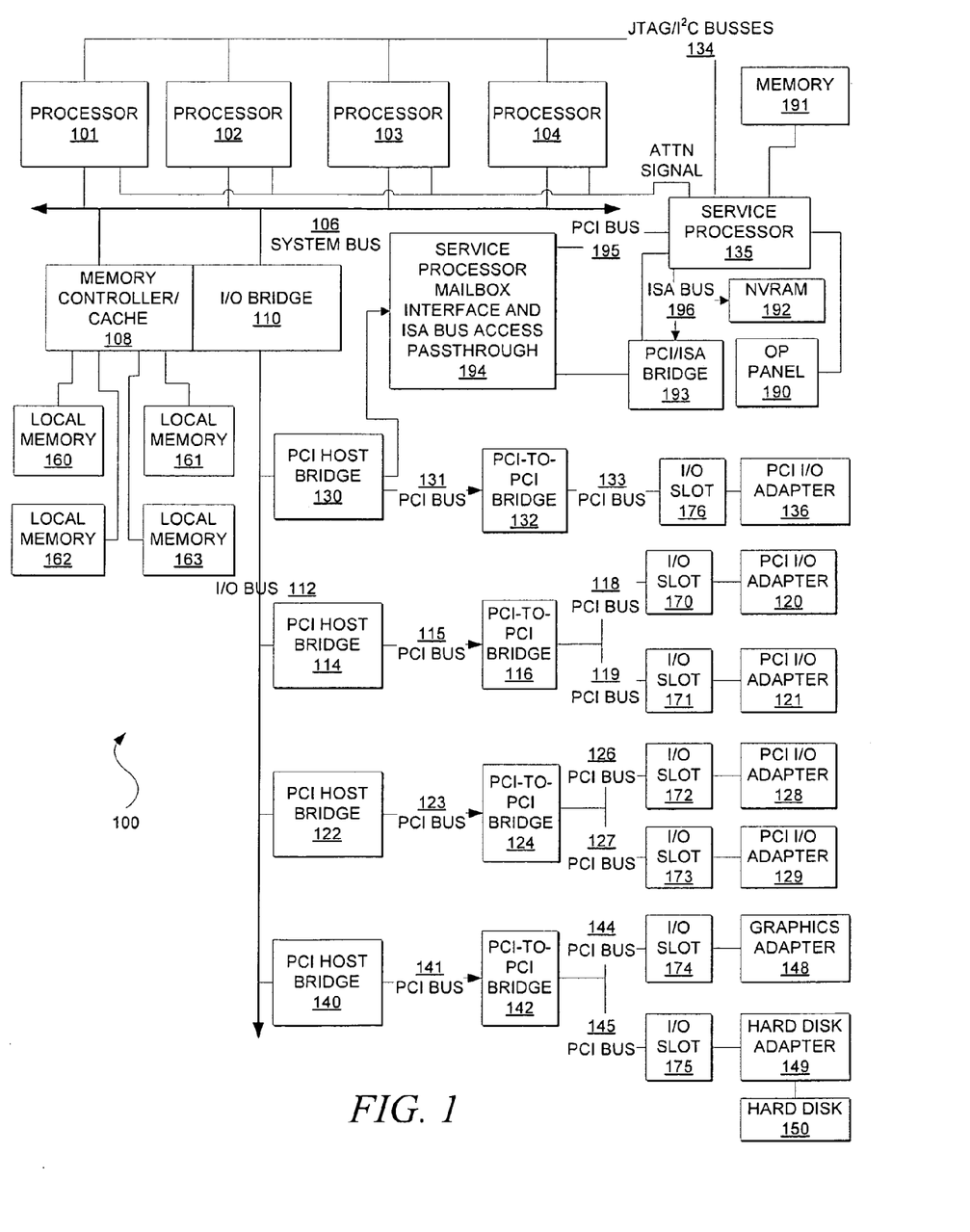
FIG. 1 is a block diagram of a data processing system in which illustrative embodiments of the current disclosure may be implemented.
Figure 2:
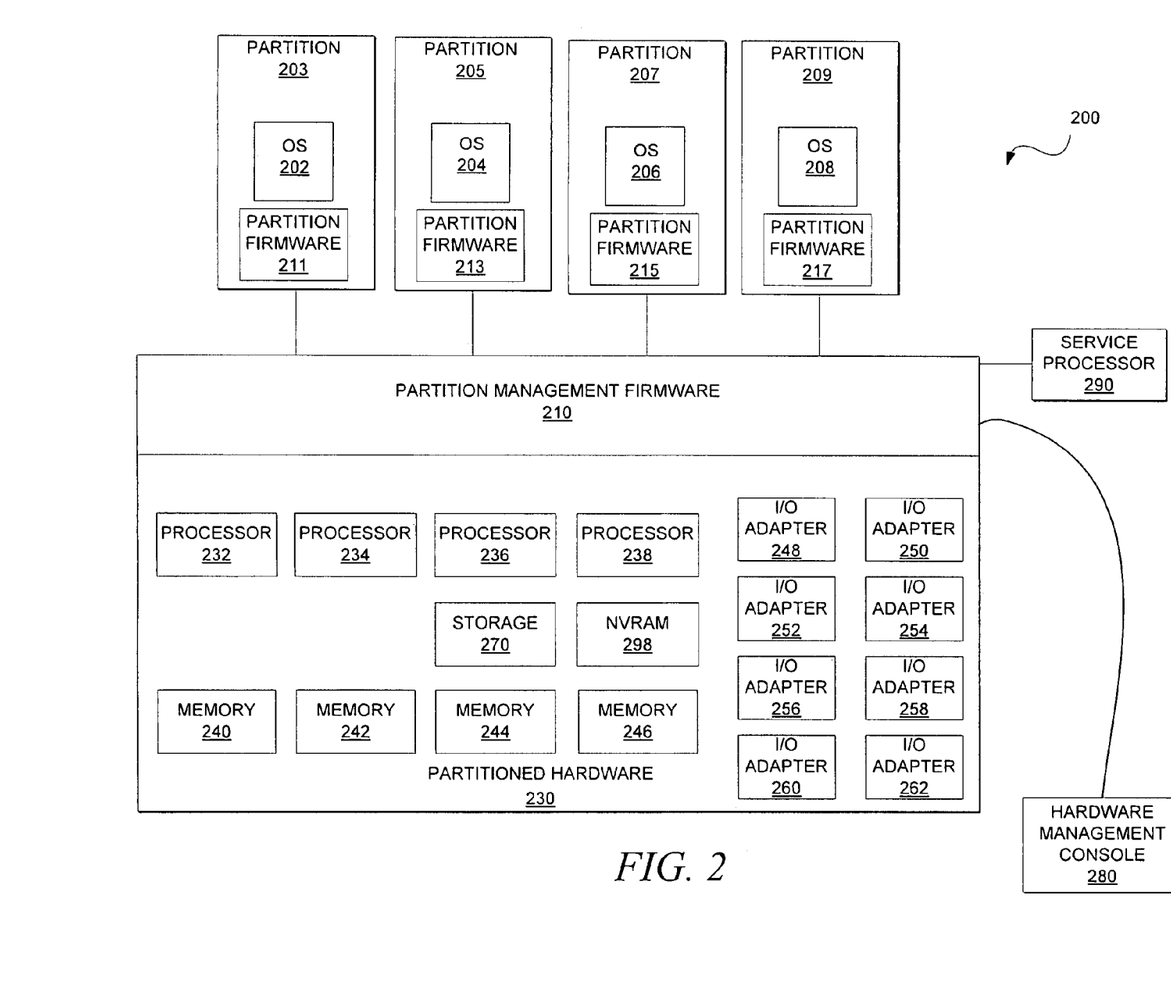
FIG. 2 depicts a block diagram of a platform that has logical partitions in which illustrated embodiments of the disclosure may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a block diagram of a data processing system in which illustrative embodiments may be implemented. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI Host Bridge 130 to the service processor mailbox interface and ISA bus access pass-through 194 and PCI-to-PCI Bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I2C busses 134. JTAG/I2C busses 134 are a combination of JTAG/scan busses (see IEEE 1149.1) and Phillips I2C busses. However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer, iSeries, and/or Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Referring now to FIG. 3A-3H, diagram 300 depicts a series of figures that represent one embodiment of an implementation process for creating multiple WPAR instances having virtualized operating systems within a global operating system. The global operating system 302 is preferably a version of the Advanced Interactive Executive (AIX) Operating System. However, other operating systems having similar ability to support WPAR instances may be used. The global operating system 302 may include an administrator with unlimited or unrestricted system privileges. The unlimited or unrestricted system privileges may be considered to be root privileges. The administrator or global user, GUser 304, may be assigned a root user ID of zero. Every user on an operating system may automatically be assigned an identification number know as a user ID. The system may use the user ID to identify and keep track of all users on the system. In the AIX Operating System, a user having root privileges always has a user ID of zero.

Figure 3A:
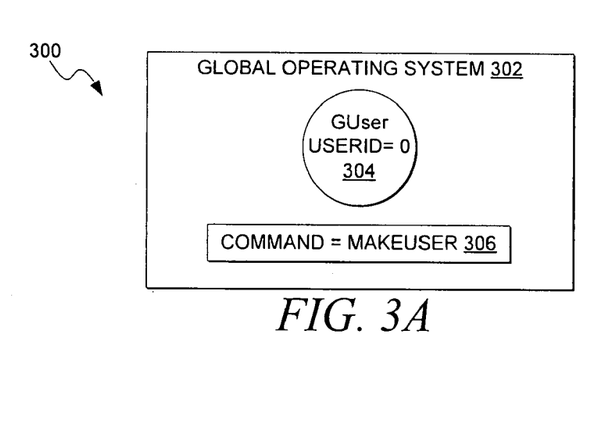
FIGS. 3A-3H are implementation diagrams representing the process of creating a virtualized operating system in a work load partition (WPAR)
Figure 3B:
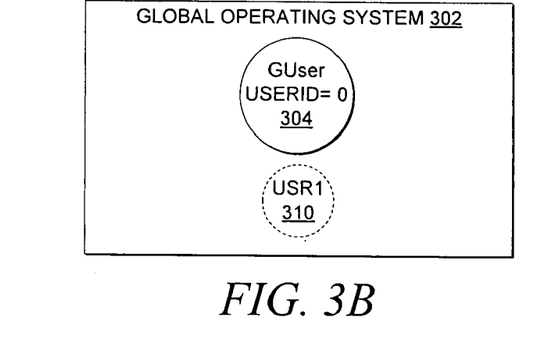

In FIG. 3A, the GUser 304 may issue a command to create a new user on the system. One such command may be MAKEUSER 306. However, it must be recognized that other commands having other formats may also accomplish the same result and the command used here is merely exemplary and not intended to be limiting. MAKEUSER 306 may cause the creation of a new USR1 308 as depicted in FIG. 3B.

Figure 3C:
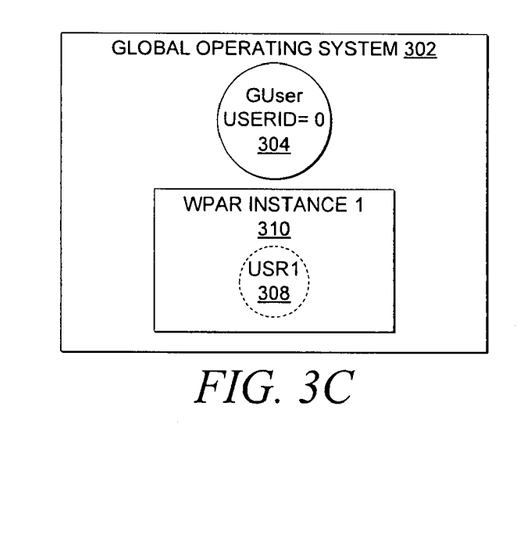

The creation of USR1 308 automatically generate a WPAR, in FIG. 3C, denoted as WPAR Instance 1 310, that is associated with the USR1 308. The WPAR may be created by software and may include a virtualized operating system, (OS) environment within the global operating system. WPAR instance 1 310 may be allocated resources from the global operating system 302. The resources allocated to WPAR instance 1 310 from the global operating system 302 may include, but is in no way limited to, memory, a central processing unit (CPU), and an internet protocol (IP) address. Global operating system 302 may also provide WPAR instance 1 310 access to network adapters, disk adapters, and network and storage devices.

Figure 3D:
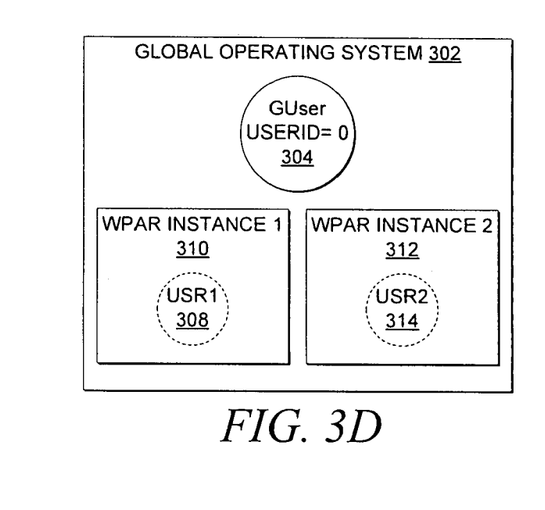

Multiple WPAR instances may exist within the global operating system 302. As shown in FIG. 3D, a WPAR instance 2 312 may also be generated based on the creation of a second user, USR2 314, by the global operating system. The creation of the second user, USR2 314, may also be created by a command from GUser 304, i.e. MAKEUSER 306.

Figure 3E:
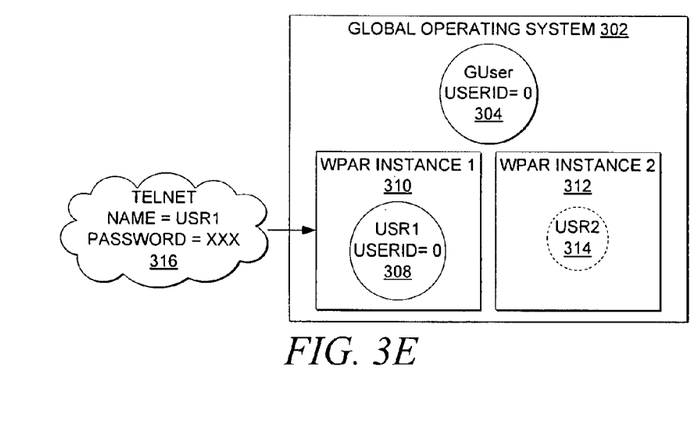

In a FIG. 3E, USR1 308 may access the global operating system 302 through a Telnet request 316. USR1 308 may authenticate into the global operating system 302 by providing a user ID and password. The user ID and password may be provided by GUser 304. The WPAR instance 1 310 that is associated with the USR1 308 may be initialized for operation by the USR1 308 login at 316. The telnet command at 344 may log the USR1 308 into the global operating system 302 as a root user with a USRID of zero. WPAR instance 1 310 is functionally and physically separate from any other WPAR instance within the global operating system 302 and also from the global operating system 302 itself. Inside WPAR instance 1 310, USR1 308 may access global devices or perform restricted operations that only a root user may be able to execute. Within WPAR instance 1 310 USR1 308 may run applications and other processes without interfacing with any of the global operating system 302 resources or any other WPAR instance.

Figure 3F:
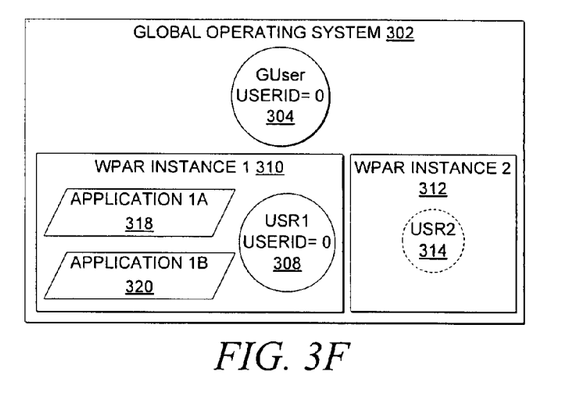

For example, in a FIG. 3F, multiple applications such as application 1A 318 and application 1B 320 may be executed within the WPAR instance 1 310 boundary. The global operating system 302 may exercise control over WPAR instance 1 310 and any other WPAR instances that may have been created by a GUser 304 command. The global operating system 302 may manage or control the operations of the virtual operating system in a WPAR instance by stopping or starting the WPAR instance within a predetermined time frame or by performing other operations which would be obvious to one skilled in the art. As a root user, USR1 308 may perform most functions of an OS within WPAR instance1 310. For example USR1 308 may run applications that require root privileges, and may also process other machines that may be on the global operating system instance 302 network. USR1 may also interact with other WPARs as nodes through the network of the global operating system 302.

Figure 3G:
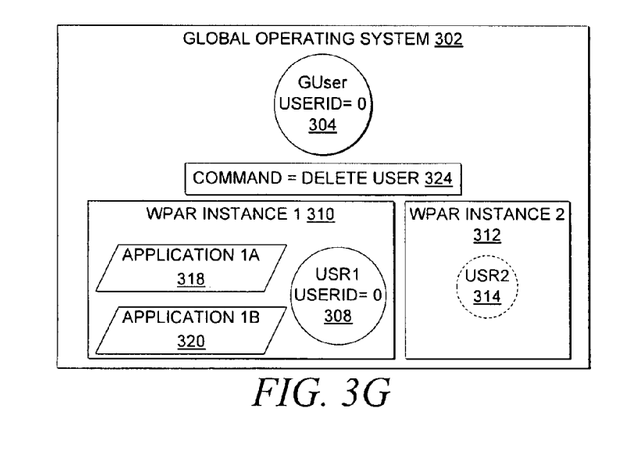

In a FIG. 3G, GUser 304 may issue a command to delete USR1 308. The command to delete USR1 308 may cause the removal of USR1 308 and its associated WPAR instance1 310. The resources allocated to WPAR instance 1 310 by the global operating system 302 will be restored to the global operating system 302 as a result of the removal of USR1 308.

Figure 3H:
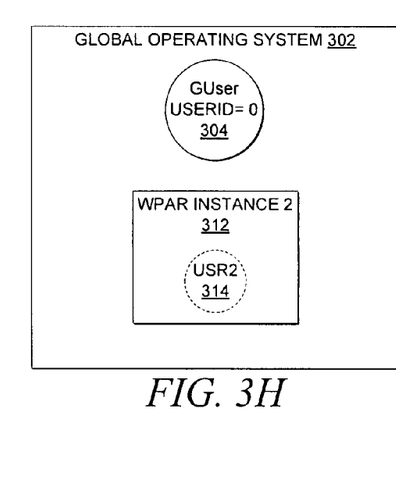

FIG. 3H illustrates how the global operating system 302 may appear after the removal of USR1 308. In FIG. 3H, the WPAR instance 1 310 that was associated with USR1 308 no longer exists within global operating system 302. All other WPAR instances created by the global operating system 302 GUser 304 commands may continue to be a permanent part of the global operating system 302 until removed by GUser 304 command.

Figure 4:
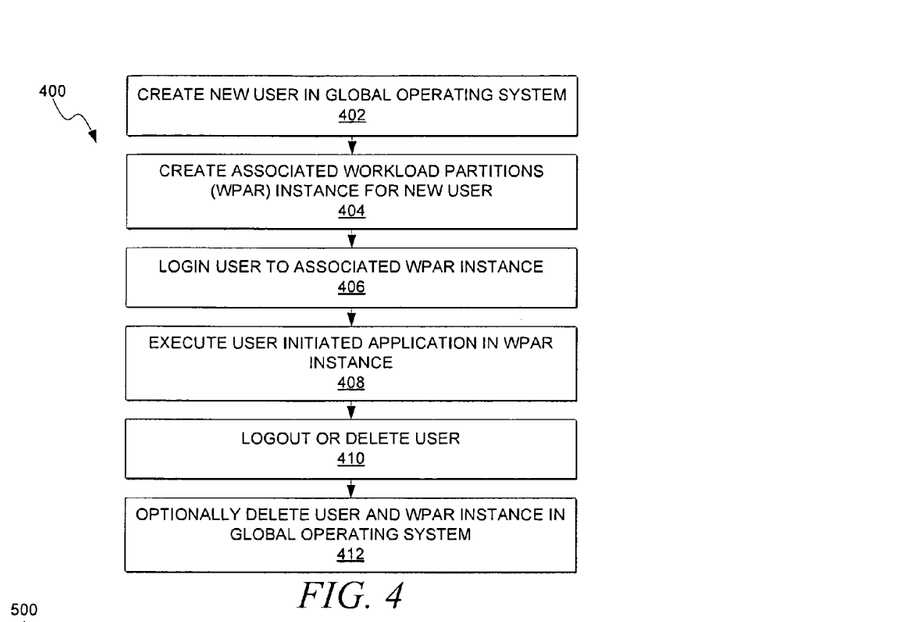
FIG. 4 is a flowchart detailing the process of creating a virtualized operating system in a WPAR.

Referring now to FIG. 4, flowchart 400 illustrates in further detail the process by which virtualized operating systems may be created within a global operating system. At 402, a new user may be created in a global operating system. The global operating system may issue a command to create a new user and additionally create a user ID and password to be associated with the new user. At 404, a WPAR instance is automatically generated and associated with the new user that was created by the global operating system command. A global operating system administrator may allocate resources to the WPAR instance. Resources may include memory, CPU, IP address, and any other resources that may be needed by the user within the WPAR instance to operate independently of the global operating system. The administrator of the global operating system may have root privileges which provide the administrator with unrestricted permissions and privileges within the global operating system. The administrator may issue a command to create multiple users within the global operating system. Each created user may have a separate WPAR instance associated with it. Additionally, each WPAR may also be allocated resources from the global operating system that enables the independent operation of the WPAR within the global operating system.

At 406, a user may login to its associated WPAR instance. The user may access the global operating system using Telnet or some other IP protocol for accessing computers. The global operating system may provide the user name and associated user password for the user login. The user will have root or unrestricted permission within its associated WPAR instance.

At 408, the user may run one or more applications that may require root privileges with its WPAR instance. The applications that may be run within the WPAR instance will have no effect on any other WPAR instance that may have been created within the global operating system. More importantly, any applications or operations that may be run within an instance of a WPAR will have no effect on the global operating system. In essence, any existing WPAR created within the global operating system cannot interact with the global operating system that may be running applications or any other WPAR instance within the global operating system. The WPAR instances, users, and applications that may be created by the global operating system may be considered permanent until removed by the global administrator.

At 410, a user may have completed running an application or other operation within a WPAR and may notify the global operating system that all operations have been completed. The user may logout and the global operating system may delete the user. As a result of the deletion on the user, at 412, the global operating system may optionally delete the WPAR instance associated with the user that has been deleted. All other WPAR instances and user may continue to exist within the global operating system until they are removed by the global administrator.

Figure 5:
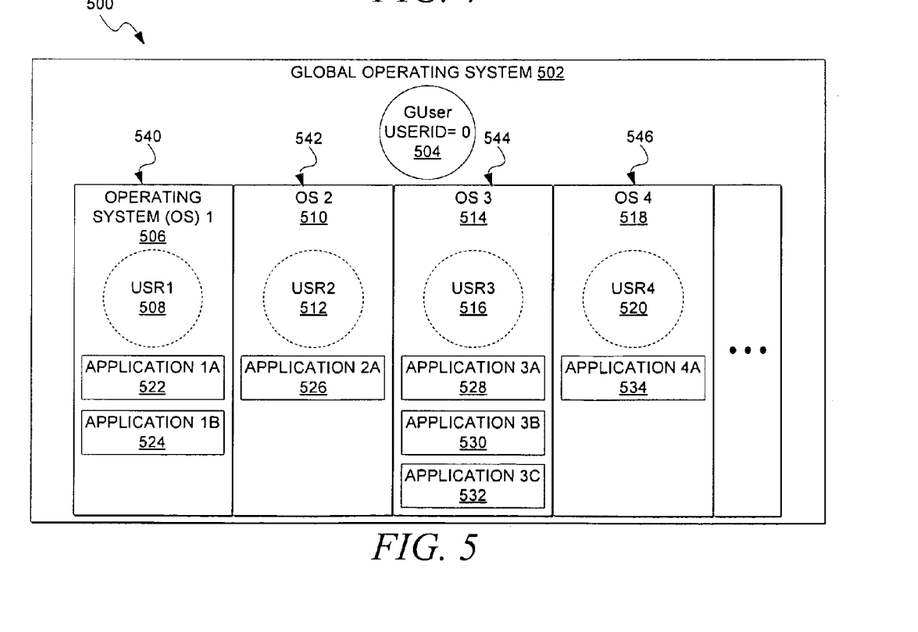
FIG. 5 is block diagram representing an exemplary view of an operating system comprising multiple users and multiple virtualized operating systems.

FIG. 5 illustrates an exemplary global operating system 500 having multiple working partitions. The global operating system may be a version of AIX or any similar operating system capable of supporting WPARs. Global operating system 502 may use a global administrator that manages or controls all operations and processes within the global operating system 502. Each user has an associated WPAR. The global administrator of the global operating system, GUser 504, may allocate hardware resources to each WPAR so that the WPAR may function as an operating system separate from the global operating system. For example, each WPAR may be allocated a CPU, memory, and an IP address. Each user may perform operations or run applications within its own operating system environment. The global operating system creates each user with root privileges which enable each user to function independently of the global operating system. For example, the global operating system provides a USR1 508 with a root user ID of zero and allocates hardware resources to enable the user to have its own dedicated operating system (OS) 1 506 within the WPAR boundary 540. The USR1 508 may execute multiple applications, for example, application 1A 522 and/or application 1B 524 within its dedicated operating system 506. USR1 508 may only function as a root user with unrestricted permissions and privileges inside OS 1. Similarly, USR2 512, USR3 516, and USR4 520, may each respectively have its own dedicated OS instance, OS 2 510, OS 3 514, and OS 4 518, respectively, inside associated WPAR boundaries 542, 544, and 546, respectively.

Specifically, USR2 512 may operate as a root user inside its dedicated virtualized operating system space 510 and run one or more applications, such as application 2A 526 within its WPAR boundary 542. Similarly, USR3 516 may operate as a root user inside its dedicated virtualized operating system 508 within its WPAR boundary 544 and may be able to execute processes or applications, such as, an application 3A 528, an application 3B 530, and an application 3C 532. The number of applications or processes that may be run within a WPAR instance may be determined by the hardware resources allocated to a particular WPAR instance. A USR4 520 may operate as a root user within a virtualized OS 518 environment and may execute applications or processes that require root privileges or root access such as an application 4A 534.

It must be noted that the number of users referenced herein is not meant to imply a limit on the number of users or WPAR instances that may be created within a global operating system environment. At least 8,192 working instances of WPAR may be created within a global operating system. Each instance of WPAR will share hardware resources with the global operating system. Each user may operate as root within its own virtualized OS environment and may be free to perform any operations as root within its dedicated WPAR instance.

In one example that illustrates the functionality of virtualized OS environments, students may require the use of an operating system to accomplish certain projects. A user and an associated WPAR instance may be created for each student. A single global operating system may be used and each student may receive a separate user name and password to enable a telnet or other login system request. Each student user may login and access may be granted to the WPAR associated with that student user. Within the associated WPAR instance, the student user may have root privileges which will enable unrestricted permissions. The student user may therefore be able to execute one or more applications that only a root user may be entitled to perform. The global operating system may delete the user from the WPAR upon completion of the user operations. The global operating system may also delete the WPAR instance associated with the user when the user is removed or deleted from the global operating system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The scope of patented subject matter is defined only by the claims. The claims, as filed, are intended to be as comprehensive as possible, and no subject matter is intentionally relinquished, dedicated, or abandoned.

What is claimed is:

1. A computer implemented method for processing multiple workloads, the method comprising:

a computer receiving an instruction to create a new user, wherein the instruction is received only from a global user having unrestricted system privileges within a global operating system;

the computer responsive to receiving the instruction, creating the new user and a new workload partition instance, wherein the new user is associated only with the new workload partition instance;

the computer allocating hardware resources from the global operating system to the new workload partition instance;

the computer authenticating the new user as a root user in the new workload partition instance so that the new user, as the root user, has unrestricted privileges and permissions to perform operations or processes within the new workload partition instance corresponding to the user that only the root user can perform;

the computer, responsive to authenticating the new user as the root user, isolating all processes launched by the user as the root user within the new workload partition instance from the global operating system and from any other workload partition instances so that the global operating system remains free from any corruption caused by applications executed by the new user as the root user; and the computer, responsive to removing the user, returning the new workload partition instance and any hardware resources allocated to the new workload partition instance to the global operating system.

2. The computer implemented method of claim 1, the method further comprising:

the computer removing the new user from the new workload partition instance; and the computer responsive to removing the new user, deleting the new workload partition instance from the global operating system.

3. The computer implemented method of claim 2, wherein deleting the new workload partition instance releases the allocated hardware resources back to the global operating system.

4. The computer implemented method of claim 1, wherein the new workload partition instance comprises a virtual operating system environment.

5. The computer implemented method of claim 1, wherein the root user in the new workload partition instance is isolated from the global operating system.

6. The computer implemented method of claim 1, wherein authenticating the new user comprises connecting to the global operating system by entering a user name and a password as part of a login process.

7. The computer implemented method of claim 6, wherein authenticating the new user further comprises issuing a telnet command that automatically start the new workload partition instance associated with the new user.

8. The computer implemented method of claim 1, wherein the isolating comprises providing each of a plurality of new users with a virtualized operating environment separate from the global operating system.

9. The computer implemented method of claim 1, further comprising:

creating a plurality of new users in the global operating system, each new user being uniquely associated with a separate workload partition instance, wherein each new user has root privileges within its respective workload partition instance.

10. The computer implemented method of claim 9, wherein each workload partition instance comprises an operating system instance.

11. The computer implemented method of claim 9, wherein authenticating the new user comprises connecting to the global operating system by entering a user name and a password as part of a login process.

12. A computer system comprising one or more processors, one or more computer-readable memories, one or more computer-readable, tangible storage devices and program instructions which are stored on the one or more computer-readable, tangible storage devices for execution by the one or more processors via the one or more memories and when executed by the one or more processors perform the method of claim 1.

13. A computer program product comprising one or more computer-readable, tangible storage devices and computer-readable program instructions which are stored on the one or more computer-readable, tangible storage devices and when executed by one or more processors, perform the method of claim 1.

14. A computer system for processing multiple workloads, the computer system comprising:
  one or more processors, one or more computer-readable memories and one or more computer-readable, tangible storage devices;
  program instructions, stored on at least one of the one or more storage devices for execution by at least one of the one or more processors via at least one of the one or more memories, for receiving an instruction to create a new user, wherein the instruction is received only from a global user having unrestricted system privileges within a global operating system;
  program instructions, stored on at least one of the one or more storage devices for execution by at least one of the one or more processors via at least one of the one or more memories, for responsive to receiving the instruction, creating the new user and a new workload partition instance, wherein the new user is associated only with the new workload partition instance;
  program instructions, stored on at least one of the one or more storage devices for execution by at least one of the one or more processors via at least one of the one or more memories, for allocating hardware resources from the global operating system to the new workload partition instance;
  program instructions, stored on at least one of the one or more storage devices for execution by at least one of the one or more processors via at least one of the one or more memories, for authenticating the new user as a root user in the new workload partition instance so that the new user, as the root user, has unrestricted privileges and permissions to perform operations or processes within the new workload partition instance corresponding to the user that only the root user can perform;
  program instructions, stored on at least one of the one or more storage devices for execution by at least one of the one or more processors via at least one of the one or more memories, responsive to authenticating the new user, for isolating all processes launched by the user as the root user within the new workload partition instance from the global operating system and from any other workload partition instances so that the global operating system remains free from any corruption caused by applications executed by the new user as the root user; and
  program instructions, stored on at least one of the one or more storage devices for execution by at least one of the one or more processors via at least one of the one or more memories, for, responsive to removing the user, returning the new workload partition instance and any hardware resources allocated to the new workload partition instance to the global operating system.

15. A computer program product for processing multiple workloads comprising:
  one or more computer-readable, tangible storage devices;
  program instructions, stored on at least one of the one or more computer-readable, tangible storage devices for receiving an instruction to create a new user, wherein the instruction is received only from a global user having unrestricted system privileges within a global operating system;
  program instructions, stored on at least one of the one or more computer-readable, tangible storage devices, responsive to receiving the instruction, creating the new user and a new workload partition instance, wherein the new user is associated only with the new workload partition instance;
  program instructions, stored on at least one of the one or more computer-readable, tangible storage devices for allocating hardware resources from the global operating system to the new workload partition instance;
  program instructions, stored on at least one of the one or more computer-readable, tangible storage devices for authenticating the new user as a root user in the new workload partition instance so that the new user, as the root user, has unrestricted privileges and permissions to perform operations or processes within the new workload partition instance corresponding to the user that only the root user can perform; and
  program instructions, stored on at least one of the one or more computer-readable, tangible storage devices, responsive to authenticating the new user, for isolating all processes launched by the user as the root user within the new workload partition instance from the global operating system and from any other workload partition instances so that the global operating system remains free from any corruption caused by applications executed by the new user as the root user; and
  program instructions, stored on at least one of the one or more computer-readable, tangible storage devices responsive to removing the user, for returning the new workload partition instance and any hardware resources allocated to the new workload partition instance to the global operating system.

* * * * *